US011913582B2

(12) United States Patent
Lusso

(10) Patent No.: US 11,913,582 B2
(45) Date of Patent: Feb. 27, 2024

(54) AIR CHUCK

(71) Applicant: Gurtech (Pty) Ltd, KwaZulu-Natal (ZA)

(72) Inventor: Cary Donald Lusso, KwaZulu-Natal (ZA)

(73) Assignee: GURTECH (PTY) LTD, Kwazulu-Natal (ZA)

( * ) Notice: Subject to any disclaimer, the term of this patent is extended or adjusted under 35 U.S.C. 154(b) by 0 days.

(21) Appl. No.: 17/370,698

(22) Filed: Jul. 8, 2021

(65) Prior Publication Data
US 2022/0146031 A1 May 12, 2022

(30) Foreign Application Priority Data
Nov. 10, 2020 (AU) ................................ 2020267180

(51) Int. Cl.
*F16L 37/35* (2006.01)
*B60S 5/04* (2006.01)

(52) U.S. Cl.
CPC ................. *F16L 37/35* (2013.01); *B60S 5/04* (2013.01)

(58) Field of Classification Search
CPC ......... F16L 37/35; F16L 37/367; F16L 37/40; F16L 37/42; F16L 37/46; F16L 37/34; F16L 37/36; F16L 37/413; F16L 37/44; B60S 5/04
USPC ......................................................... 137/231
See application file for complete search history.

(56) References Cited

U.S. PATENT DOCUMENTS

| | | | | |
|---|---|---|---|---|
| 308,843 A * | 12/1884 | Kelsey | ..................... | F16L 37/32 137/614.04 |
| 1,500,531 A * | 7/1924 | Schweinert | ........... | B60C 29/064 411/433 |
| 2,837,350 A * | 6/1958 | Druge | ..................... | F16K 15/20 285/17 |
| 4,664,453 A | 5/1987 | Kade et al. | | |
| 4,716,938 A * | 1/1988 | Weh | ..................... | F16L 37/1215 138/93 |

(Continued)

FOREIGN PATENT DOCUMENTS

IT  BO20100367  12/2011

OTHER PUBLICATIONS

Australian Examination Report for AU 2020267180 dated Dec. 11, 2020, 8 pages.

*Primary Examiner* — Kevin F Murphy
*Assistant Examiner* — Jonathan J Waddy
(74) *Attorney, Agent, or Firm* — NIXON & VANDERHYE

(57) ABSTRACT

An air chuck for facilitating the connection of a pneumatic hose with a threaded stem of a tire valve includes a housing with an air passage. The housing includes an air inlet port connectable to the pneumatic hose, and an air outlet passage to receive the threaded stem of the tire valve. A clamping member is mounted externally about the outlet passage and includes a hollow tubular member, a front end portion of which terminates in a plurality of separate, radially deflectable fingers, a free end portion of each finger extending towards the discharge end of the outlet passage. The free end portions of each finger define an aperture for receiving the threaded stem of the tire valve. The size of the aperture is variable by the movement of a sleeve, slidable over the body of the housing and the clamping member.

16 Claims, 8 Drawing Sheets

(56) References Cited

U.S. PATENT DOCUMENTS

| | | | | |
|---|---|---|---|---|
| 5,630,570 | A * | 5/1997 | Lacroix | F16L 37/42 251/149.9 |
| 5,634,624 | A * | 6/1997 | Lacroix | F16L 37/42 251/149.6 |
| 6,279,874 | B1 * | 8/2001 | Nyberg | F16L 37/121 137/614.03 |
| 6,283,443 | B1 * | 9/2001 | Taneya | F16L 37/133 251/149.6 |
| 6,401,744 | B1 * | 6/2002 | Van Der Blom | F16L 37/12 137/224 |
| 6,669,168 | B2 * | 12/2003 | Scheffel | F16L 37/32 251/149.6 |
| 8,955,544 | B2 | 2/2015 | Gurney | |
| 9,249,914 | B2 * | 2/2016 | Kuo | F16L 37/1215 |
| 2008/0190489 | A1 * | 8/2008 | Wrubel | F16L 37/35 251/149.1 |
| 2009/0050836 | A1 * | 2/2009 | Chang | F16L 37/40 251/353 |
| 2012/0086202 | A1 * | 4/2012 | Tiberghien | F16L 37/138 285/332 |
| 2013/0284312 | A1 * | 10/2013 | Chou | F16K 15/20 141/38 |
| 2017/0328164 | A1 * | 11/2017 | Partridge | E21B 33/076 |
| 2019/0219209 | A1 * | 7/2019 | Zeiber | F16L 37/34 |

* cited by examiner

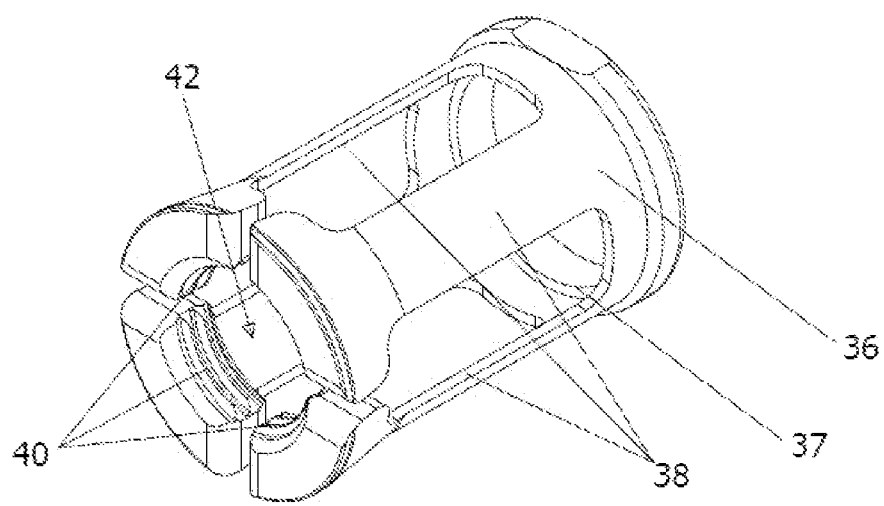
FIGURE 6A
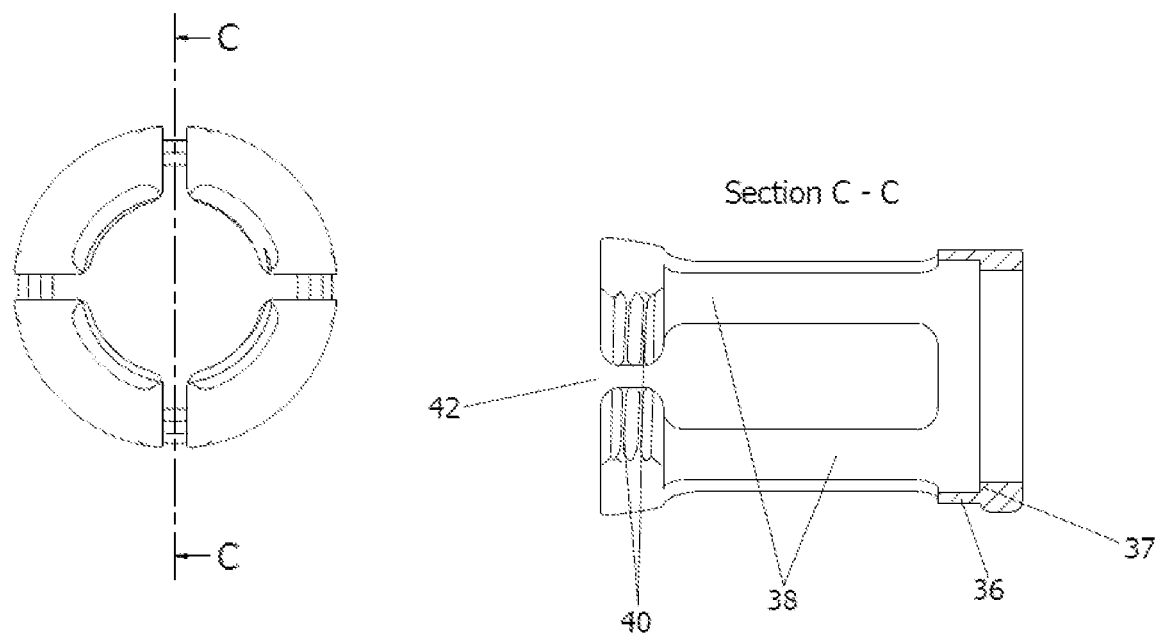
FIGURE 6B
Section C - C
FIGURE 6C

AIR CHUCK

CROSS-REFERENCE TO RELATED APPLICATIONS

This application claims priority to Australian application no. 2020267180 filed Nov. 10, 2020, the entire contents of each of which are hereby incorporated by reference.

TECHNICAL FIELD OF THE INVENTION

This invention relates to an air chuck for use in connecting a pneumatic hose to a tyre valve to facilitate the effective inflation or deflation of a pneumatic tyre, and more particularly to a means for locking the air chuck onto the threaded portion of the tyre valve and a seal having a wide range of sealing positions.

BACKGROUND ART

Since the pneumatic tyre was invented in the late 1800's and the subsequent invention of the Schrader valve in 1891, there has been a need to connect a pressurized air hose to the valve of a pneumatic tyre, for effective inflation or deflation of the tyre, to achieve the desired operating pressure. Tyre pressure must also be checked at regular intervals to ensure optimum pressure is maintained. Optimum tyre pressure is dependent on the tyre design, tyre loading and the road conditions, and has a direct impact on tyre performance and tyre life. The connection between the air hose and the tyre is commonly achieved using an air chuck. Air chucks commonly available in the market can be divided into two categories:

The first category being the push on type, that must be physically held in place by the operator and in its simplest form consists of an outer body housing a flat, washer type, rubber seal and a centre pin configured to open the tyre valve when engaged to allow for bi-directional air flow. This type of air chuck can be tiresome to use, as a minimum amount of force is required to be applied to the chuck at all times, while also maintaining correct alignment between the chuck and the tyre valve, to ensure that the seal between the air chuck and the tyre valve is effective. The air chucks in the second category include some form of clamping mechanism to retain the air chuck onto the threaded stem of the tyre valve, facilitating inflation or deflation of the tyre without the operator having to physically hold the air chuck in position. The most common of these air chucks consists of an air chuck body defining an air passage through its full length, the rear end of the body being threaded for attachment to an air hose and the front of the body housing a fixed seal of similar design to that of the push on type air chuck. In addition to the fixed seal, a sprung loaded locking blade is located through the side of the air chuck body, perpendicular to the axis of the tyre valve. In use, the blade is retracted clear of the front bore to allow the air chuck to be pushed onto the tyre valve. Once the air chuck is positioned on the tyre valve, the sprung-loaded blade is released to engage with the threaded stem of the tyre valve, retaining the air chuck in position.

There are a number of disadvantages to this design. Firstly, in order to achieve an effective airtight seal, the fixed seal of the air chuck must be pushed hard against the top face of the tyre valve before the blade engages on the threaded stem of the tyre valve. If the blade is unable to engage the thread in that position, it will engage the next available thread higher on the valve stem, thus resulting in the fixed seal no longer being pushed hard against the top face of the tyre valve and therefore an in ability to achieve sealing contact. In practice the operator can remedy this by turning the air chuck in a clockwise direction and with the blade engaged in the threaded stem of the tyre valve, the blade acts as a nut to thread the air chuck onto the tyre valve. This action results in the top face of the tyre valve been pressed against the air chuck seal and achieving an air tight seal between the air chuck and the tyre valve. While this action is effective, it is time consuming and awkward and the engaging blade is prone to damaging the thread on the tyre valve.

Secondly, the engaging blade is of such a design that it only engages on a single side of the tyre valve. Under pressure the blade can easily slip or jump over the thread, causing further damage to the thread and moving the top face of the tyre valve out of sealing contact with the fixed seal, resulting in air bypassing between the air chuck and the tyre valve.

Thirdly, certain modern tyre valves have very short threads on the end of the valve stem. As the blade engages down the thread stem of the tyre valve, it can be the case that when the air chuck is pushed all the way onto the tyre valve there are no threads available for the blade to engage onto and the operator then needs to hold the air chuck in position to achieve an effective air tight seal.

In light of the above, a need exists for an air chuck useful in providing an improved positive locking mechanism. Embodiments of the invention thus aim to address the issues identified above, at least to some extent

SUMMARY OF THE INVENTION

In accordance with this invention there is provided an air chuck configured to facilitate the connection of a pneumatic hose with a threaded stem of a tyre valve, the air chuck comprising: an elongate housing defining an air passage through the full length thereof, a rear end of the housing including an air inlet port configured to connect to the pneumatic hose, and a front section of the housing comprising an air outlet passage, the discharge end of which is configured to receive the threaded stem of the tyre valve;

and a clamping member, mounted externally about the outlet passage, the clamping member comprising a hollow tubular member, at least the front end portion of which terminates in a plurality of separate, radially deflectable fingers, a free end portion of each finger extending towards the discharge end of the outlet passage, the combined free end portions of each finger together defining an aperture, configured to receive the threaded stem of the tyre valve, wherein one or more engaging formations are located on an internal face of each finger towards the free end portion, the size of the aperture being variable by the movement of a sleeve member, slidable over the body of the elongate housing and the clamping member, between a first position in which the fingers are compressed inwards to minimise the size of the aperture for engagement of the one or more engaging formations with the threaded stem of the tyre valve, and a second position in which the fingers are released to deflect outwards, such that the size of the aperture is increased to release the threaded stem of the tyre valve from engagement with the one or more engaging formations.

The one or more engaging formations located on the internal faces of the free end portion of each finger preferably comprise an internal thread, complementary to the thread of the threaded stem of the tyre valve.

In a preferred form of the invention, the free end portion of each finger extends beyond the discharge end of the outlet passage.

The sleeve member is biased in the first position by a first biasing spring, mounted externally about the elongate housing and internally of the sleeve.

The sleeve member is connected to a trigger, pivotally mounted on the elongate housing. The trigger is connected to the sleeve member via a linkage mechanism associated with the sleeve member.

Activation of the trigger draws the sleeve member from its first position, over the elongate housing against the bias of the spring, to its second position, to release the free ends of the deflectable fingers of the clamping member from compression, increasing the size of the threaded aperture and permitting receipt of the threaded stem of the tyre valve.

Release of the trigger causes the inherent bias of the spring to slide the sleeve member from the second position back to the first position, compressing the free ends of the deflectable fingers to positively engage with the threaded stem of the tyre valve.

In a preferred embodiment of the invention, when the sleeve member is in the first position it is located in a forward position on the elongate housing, and when the sleeve member is in the second position it is pulled backwards.

The air inlet port extends into a narrower diameter air inlet passage, which terminates at a shoulder, to define an entrance to the air outlet passage.

An elastomeric seal may be located within the air outlet passage to facilitate an air tight seal between the air chuck and tyre valve. The seal may be slidably located within the air outlet passage and biased by a spring in a forward position.

In a preferred embodiment of the invention, the elastomeric seal is mounted on an air shut off valve mechanism, configured to prevent air flow through the elongate housing when the air chuck is disconnected from the tyre valve.

The air shutoff valve mechanism comprises an elongate member, slidably located in the air passage, a first end of the elongate member being located within the air inlet passage and comprising an annular flange, wider in diameter than the entrance to the air outlet passage, and a second end of the elongate member being located towards the discharge end of the air outlet passage and comprising a tyre valve opening pin.

The elastomeric seal is mounted about the tyre valve opening pin section of the air shutoff valve mechanism and a further sealing element is mounted on the annular flange. The air shutoff valve mechanism is biased in the shutoff position by a second spring, mounted about the body of the elongate member, between the entrance to the air outlet passage and the elastomeric seal.

A central bore extends through the elastomeric seal. The internal diameter of the central bore of the elastomeric seal is greater than the outer diameter of the tyre valve opening pin to provide an air passage between the elastomeric seal and the tyre valve opening pin.

The elastomeric seal is mounted on a seal retainer, comprising a tubular body, receivable on the elongate member of the air shutoff valve mechanism and including an external mounting groove configured to retain the elastomeric seal.

The elastomeric seal and seal retainer are dimensioned such that the outer wall of the elastomeric seal contacts the inner wall of the air outlet passage of the elongate housing in a sliding sealing fit.

One or more air communication ports extend from behind the elastomeric seal to the air passage between the elastomeric seal and the tyre valve opening pin.

BRIEF DESCRIPTION OF DRAWINGS

A preferred embodiment of the invention is described below by way of example only and with reference to the following drawings, in which;

FIG. 6A is a perspective view of the internally threaded clamping member;

FIG. 6B is an end view of the internally threaded clamping member;

FIG. 6C is a cross-sectional view of the clamping member taken substantially on line C-C of FIG. 6B;

DETAILED DESCRIPTION OF THE PREFERRED EMBODIMENT

The following description is provided as an enabling teaching of the invention, is illustrative of principles associated with the invention and is not intended to limit the scope of the invention. Changes may be made to the embodiment/s depicted and described, while still attaining results of the present invention and/or without departing from the scope of the invention. Furthermore, it will be understood that some results or advantages of the present invention may be attained by selecting some of the features of the present invention without utilising other features. Accordingly, those skilled in the art will recognise that modifications and adaptations to the present invention may be possible and may even be desirable in certain circumstances, and may form part of the present invention.

For ease of reference and understanding, in FIGS. 1 to 8D, like features of the invention are indicated by like numerals.

Figure 1:
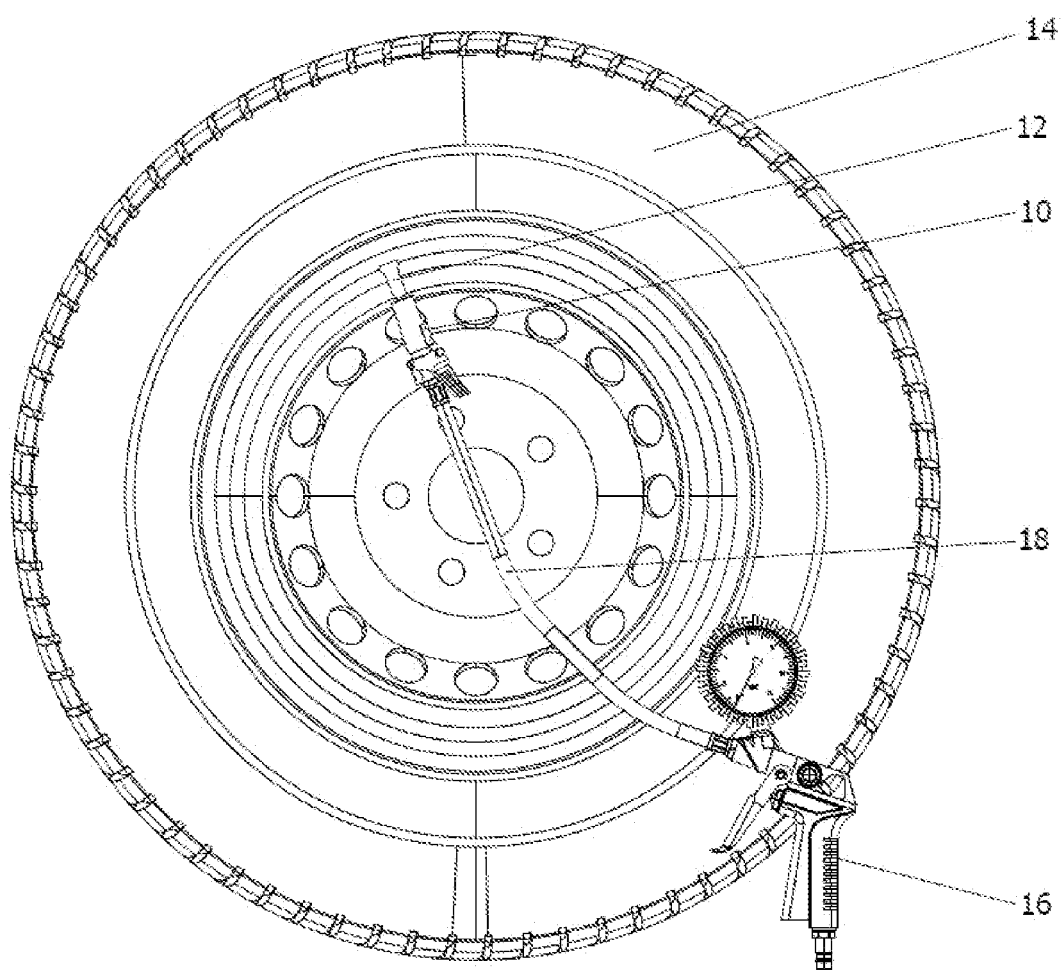
FIG. 1 is a perspective view of an embodiment of the air chuck of the invention depicted in use for inflating a pneumatic tyre.
Figure 2A:
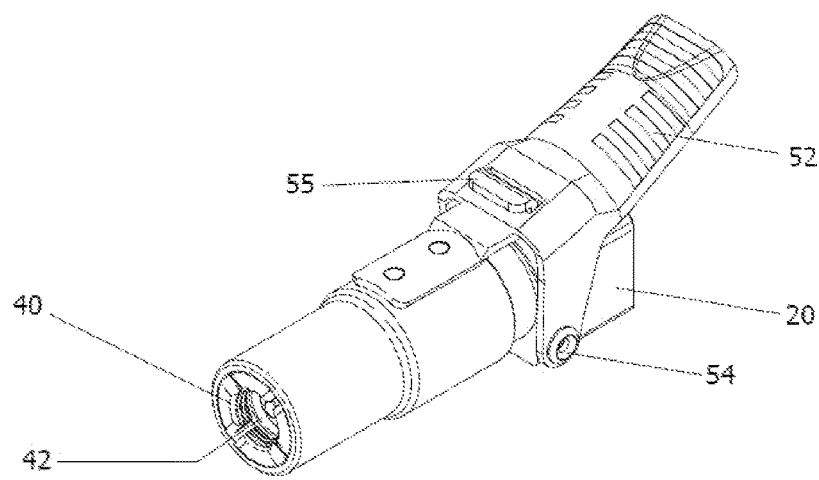
FIG. 2A is a perspective view of the air chuck of the invention in its fully closed default position.
Figure 2B:
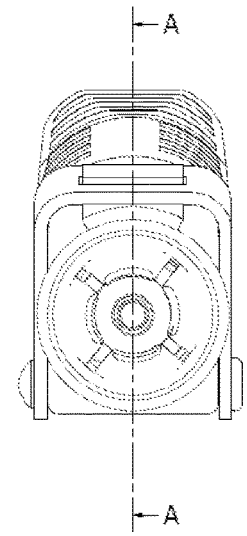
FIG. 2B is an end view of the air chuck of FIG. 2A.
Figure 2C:
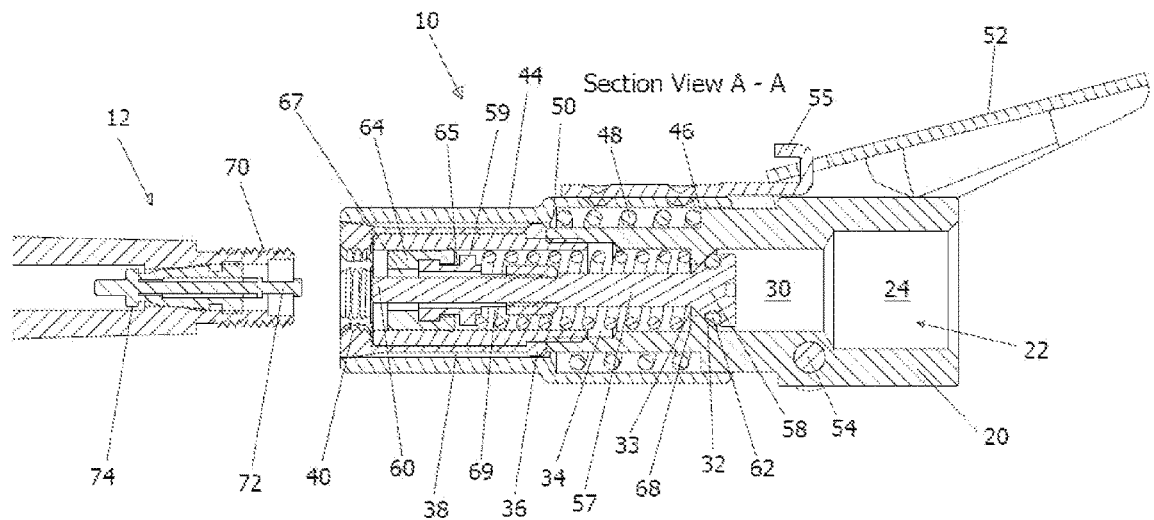
FIG. 2C is a cross-sectional view of the air chuck taken substantially on line A-A of FIG. 2B. In addition the cross-sectional view of a standard tyre valve is shown in a shutoff position.

Referring to FIG. 1, the air chuck of the invention (10) provides a means of connecting a source of compressed air via an air control valve (16) to a tyre valve (12) of a pneumatic tyre (14). The air chuck (10) is connected to a pneumatic hose (18) and positively engages with the tyre valve (12), facilitating the inflation or deflation of the pneumatic tyre (14) while maintaining an air tight seal between the tyre valve (12) and the air chuck (10).

Referring to FIGS. 2A-2C, FIGS. 7A & 7B and FIGS. 8A-8B the air chuck (10) comprises an elongate housing (20) defining an air passage (22) through the full length thereof. A threaded air inlet port (24), configured to connect to an pneumatic hose (18, FIG. 1), is located at the rear of the housing (20), while an air outlet passage (34), the discharge end of which is configured to receive the threaded stem (70) of the tyre valve (12), is located towards the front section of the housing (20). A narrower diameter air inlet passage (30) extends from the air inlet port (24). The air inlet passage (30) terminates at a shoulder (32) defining the entrance (33) to the air outlet passage (34).

A clamping member in the form of a hollow tubular member (36) with a plurality of radially deflectable fingers (38) extending therefrom, is mounted externally about the air outlet passage (34) section of the elongate housing (20). The free end of each radially deflectable finger (38) extends past the discharge end of the air outlet passage (34). The internal face (40) of the free end portion of each finger (38) is threaded, so that the fingers (38) together define a threaded aperture (42), configured to receive the threaded stem (70) of the tyre valve (12). Refer to FIGS. 6A-6C for an isolated view of the clamping member.

A sleeve (44) is slidably mounted over both the body of the elongate housing (20) and the clamping member. The sleeve (44) is slidable between a first position (FIG. 2) in which the fingers (38) of the clamping member are compressed inwards to minimise the size of the threaded aperture (42) to facilitate engagement of the threaded faces (40) with the threaded stem (70) of the tyre valve (12) in a threaded connection, and a second position (FIG. 3) in which the fingers (38) are released to deflect outwards, sufficiently increasing the size of the threaded aperture (42) to release the threaded stem (70) of the tyre valve (12).

The external surface of the elongate housing (20) is stepped, to provide an annular shoulder (46). A first compression spring (48) is mounted about the elongate housing (20), internally of the sleeve (44), with the rear end of the spring (48) abutting the annular shoulder (46) of the elongate housing (20), and the front end of the spring (48) abutting a stepped internal surface (50) of the sleeve (44). The spring (48) biases the sleeve into the first position for retaining the threaded stem of the tyre valve within the internally threaded face (40) of the clamping member. In the preferred embodiment, the first position is a forward position.

A trigger mechanism (52) is pivotally mounted to the elongate housing (20) at pivot point (54). A linkage (55) extends from the rear of the sleeve (44) and connects the sleeve (44) to the trigger mechanism (52). The first compression spring (48) not only biases the sleeve (44) in the forward position, but also the trigger mechanism (52) in its upward position, via the linkage (55).

An air shutoff valve mechanism (56) in the form of a solid shaft (57) is slidably located in the air passage (22) of the elongate housing (20) and extends from the air inlet passage (30) through the length of the air outlet passage (34). The rear portion (58) of the air shutoff valve mechanism (56), located within the air inlet passage (30), comprises a flange which is greater in diameter than the entrance (33) to the air outlet passage (34), and tapers to form the shaft (57) which terminates in a tyre valve opening pin (60) towards the discharge end of the air outlet passage (34).

A sealing member in the form of an O-ring seal (62) is mounted on the tapering rear portion (58) of the shaft (57), to facilitate a sealing fit between the rear portion (58) of the shaft (57) and the shoulder (32) at the entrance (33) to the air outlet passage (34).

An elastomeric seal (64), with a central bore (67) extending through its length is mounted on a seal retainer (59). The seal retainer (59) comprises a tubular body, receivable on the shaft (57) of the air shutoff valve mechanism (56). In this embodiment, the tubular body of the seal retainer (59) is receivable on the shaft (57) of the air shut off valve mechanism in a threaded connection. An external mounting groove (65) located on the tubular body of the seal retainer (59) retains the elastomeric seal (64) onto the shutoff valve mechanism (56).

The elastomeric seal (64), and seal retainer (59) are dimensioned such that the outer wall of the elastomeric seal (64) contacts the inner wall of the air outlet passage (34) of the elongate housing (20) in a sliding sealing fit.

The internal diameter of the central bore (67) of the elastomeric seal (64) is greater than the outer diameter of the tyre valve opening pin (60) to provide an air passage between the elastomeric seal (64) and the tyre valve opening pin (60).

One or more air communication ports (69) are provided from behind the elastomeric seal (64) to the air passage between the elastomeric seal (64) and the tyre valve opening pin (60).

The air communication ports (69) facilitate the flow of air through the central bore (67) of the elastomeric seal.

The tyre valve opening pin (60) extends just beyond the elastomeric seal (64).

The air shutoff valve mechanism (56) is biased in the shutoff position by a second compression spring (66) mounted about the shaft (57). The rear of the second compression spring (66) abuts the shoulder (68) of the entrance (33) to the air outlet passage (34), and the front of the second compression spring (66) abuts the seal retainer (59).

Referring to FIGS. 2, 3, 4 and 5, the cross section of a tyre valve (12) is also shown with outer valve threads (70), valve pin (72) and valve seal (74), the tyre valve is by default in a shutoff position by the means of an internal biasing spring (not shown) and assisted by the air pressure within the pneumatic tyre. Although the tyre valve (12) depicted is a standard Schrader valve, the air chuck of the invention is not limited in application to only the Schrader type tyre valve.

Figure 3A:
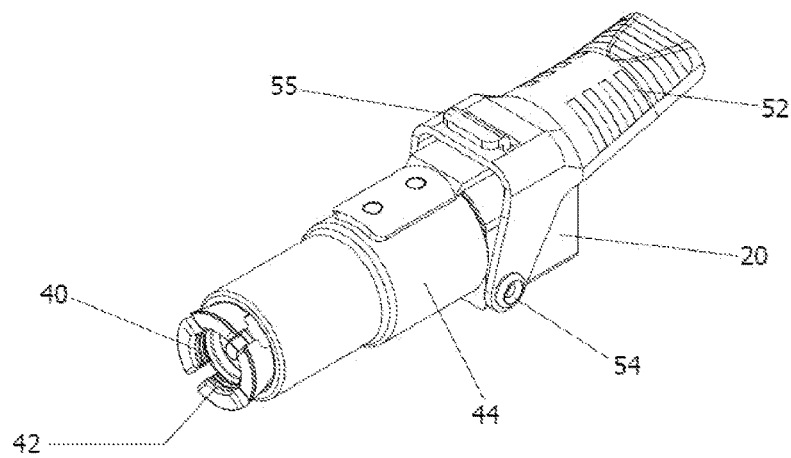
FIG. 3A is a perspective view of the air chuck of the invention depicting the clamping member in an open position.
Figure 3B:
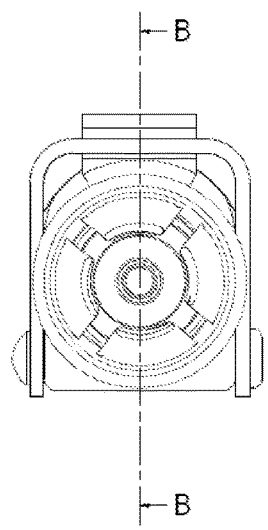
FIG. 3B is an end view of the air chuck of FIG. 3A.
Figure 3C:
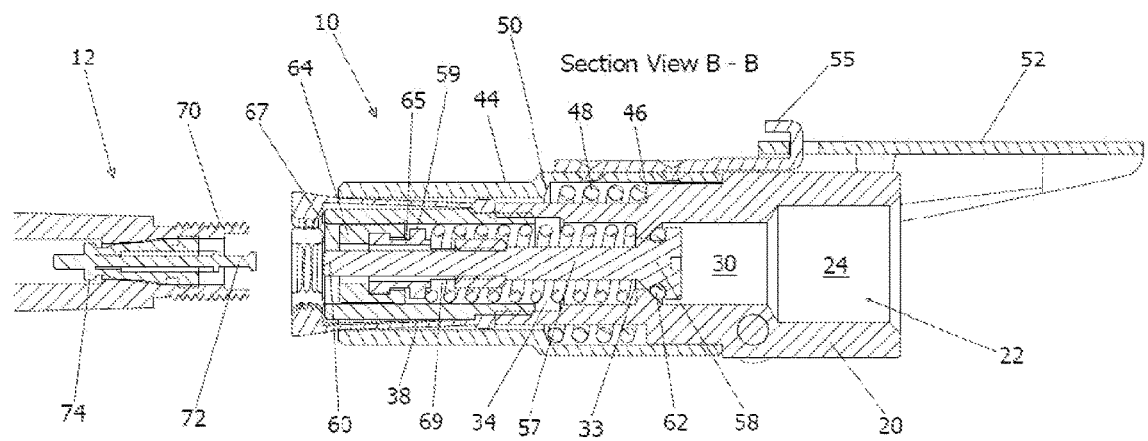
FIG. 3C is a cross-sectional view of the air chuck of the invention taken substantially on line B-B of FIG. 3B. In addition, the cross-sectional view of a standard tyre valve is shown in a shutoff position.

Referring to FIGS. 3A-3C, when the trigger mechanism (52) is depressed, the sleeve (44) is fully retracted via the linkage (55). With the sliding sleeve (44) retracted, the fingers (38) of the clamping member spring open to their naturally open position. In such a position the air chuck (10) is ready to engage the tyre valve (12).

Figure 4A:
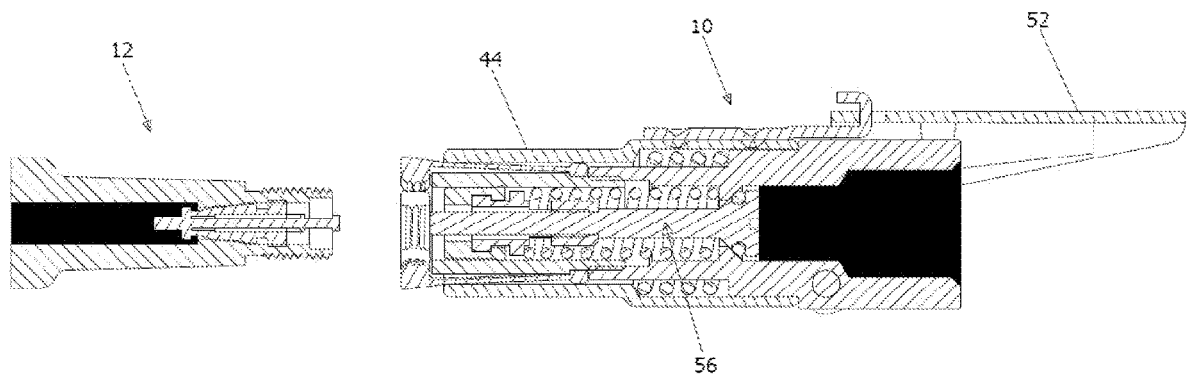
FIG. 4A is a cross-sectional view of the air chuck of the invention and of a tyre valve; depicting the shutoff valves in the closed position, the black areas indicating where the flow of air has been shut-off.
Figure 4B:
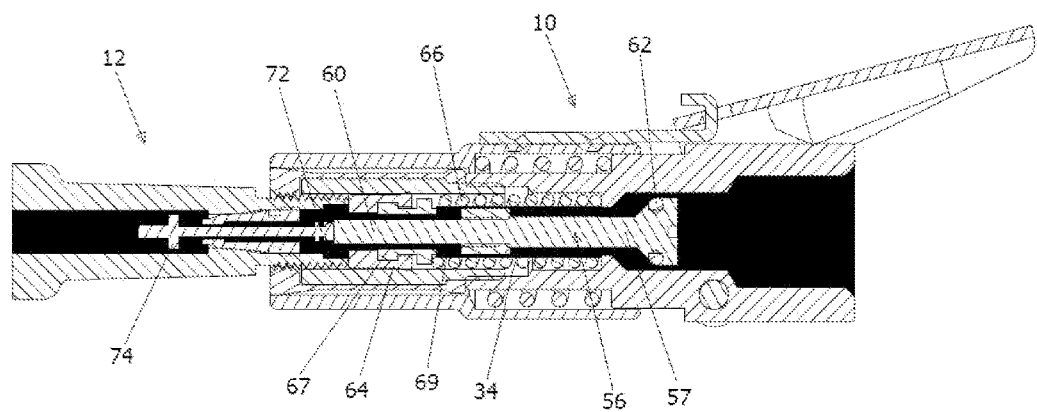
FIG. 4B is a cross-sectional view of the air chuck of the invention connected to the tyre valve and depicting the shutoff valves opened, the black areas indicating the passage of air through the air chuck and the tyre valve.

Referring to FIGS. 4A and 4B, the sequence of attaching the air chuck (10) to the tyre valve (12) is depicted. Referring to FIG. 4A, the tyre valve (12) and the air chuck (10) are apart from one another, but the trigger (52) has been depressed, and the sleeve (44) retracted. The shutoff valve mechanism (56) of the air chuck is closed, as is the tyre valve seal (74) in the tyre valve (12).

Referring to FIG. 4B, as the air chuck (10) is pushed onto the tyre valve (12) the valve opening pin (60) engages with the valve pin (72) of the tyre valve (12), pushing the valve pin (72) back and opening the tyre valve seal (74). On further engagement of the air chuck (10) with the tyre valve (12), the top face of the tyre valve (12) comes into sealing contact with the elastomeric seal (64). As the air chuck (10) is pushed further onto the tyre valve (12), the elastomeric seal (64), along with the shutoff valve mechanism (56), is pushed back into the air outlet passage (34), against the bias of the second compression spring (66). As the shaft (57) of the shutoff valve mechanism (56) is pushed backwards, the O-ring seal (62) is pushed off shoulder (32) and the entrance (33) between the air inlet passage (30) and the air outlet passage (34) is opened to allow the bidirectional free flow of air between the air control valve (16) and the pneumatic tyre (14).

Such a design is favourable to inflate larger tyres directly from a compressed air line rather than having a control valve between the air line and the air chuck, thus when the air chuck is attached directly to the air line there is no flow of air until the air chuck is attached to the tyre valve and likewise, as it is disconnected, the flow of air is shutoff.

Furthermore, because the elastomeric seal (64) is mounted on the shutoff valve mechanism (56), it is also sprung loaded, thus allowing a wide range of sealing positions. It is not necessary for the operator to push the air chuck (10) hard against the tyre valve (12) to achieve an effective airtight seal.

Referring to FIGS. 5A to 5F, a typical engagement and disengagement sequence is illustrated.

Figures 5A, 5B, 5C, 5D, 5E, 5F:
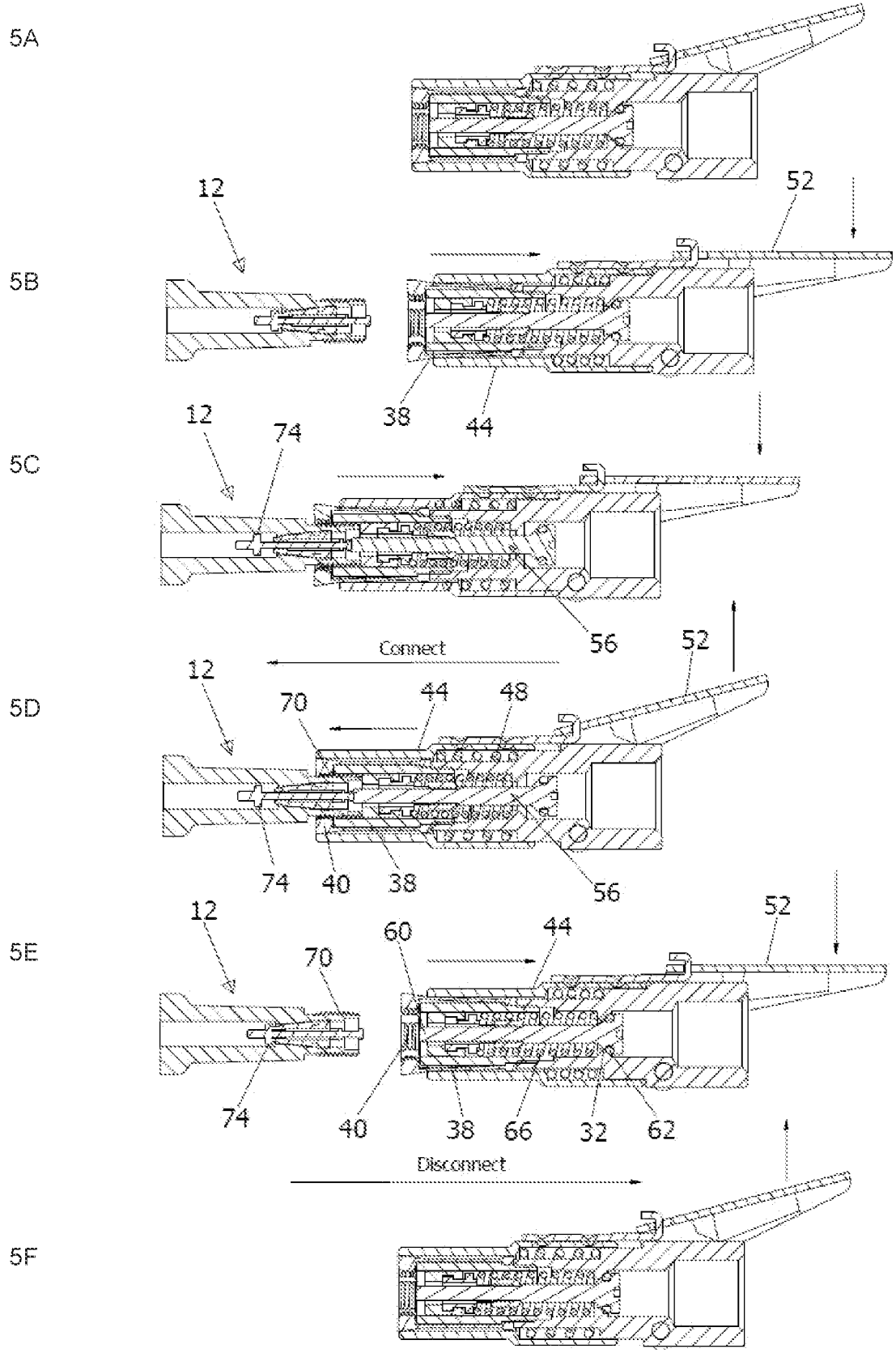
FIGS. 5A-F are cross-sectional views of the air chuck of the invention, depicting the engagement sequence of the air chuck with the tyre valve in a standard operating cycle.
Figure 7A:
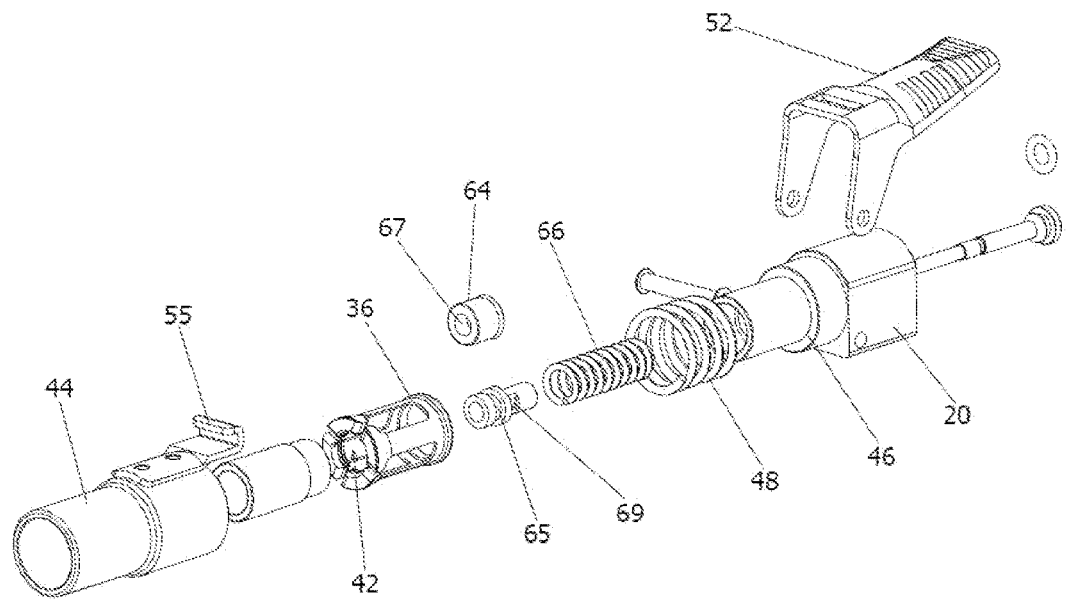
FIG. 7A is a perspective exploded view of the air chuck of the invention.
Figure 7B:
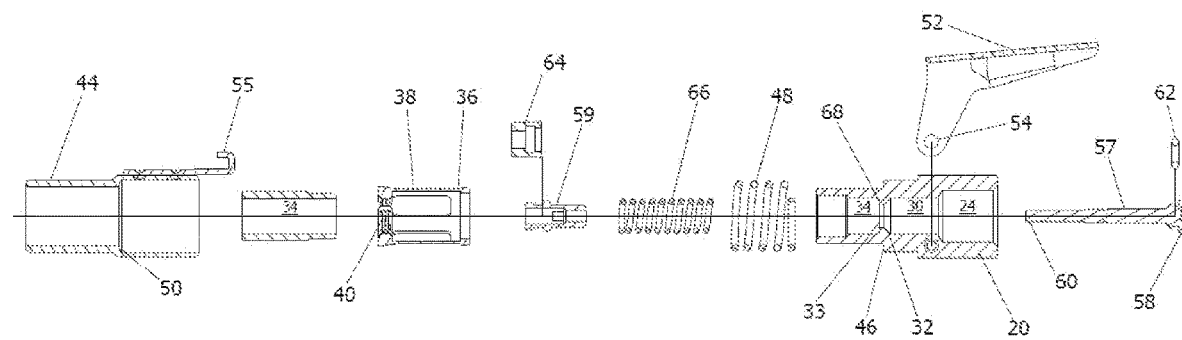
FIG. 7B is a cross-sectional view of the exploded view of FIG. 7A.
Figure 8A:
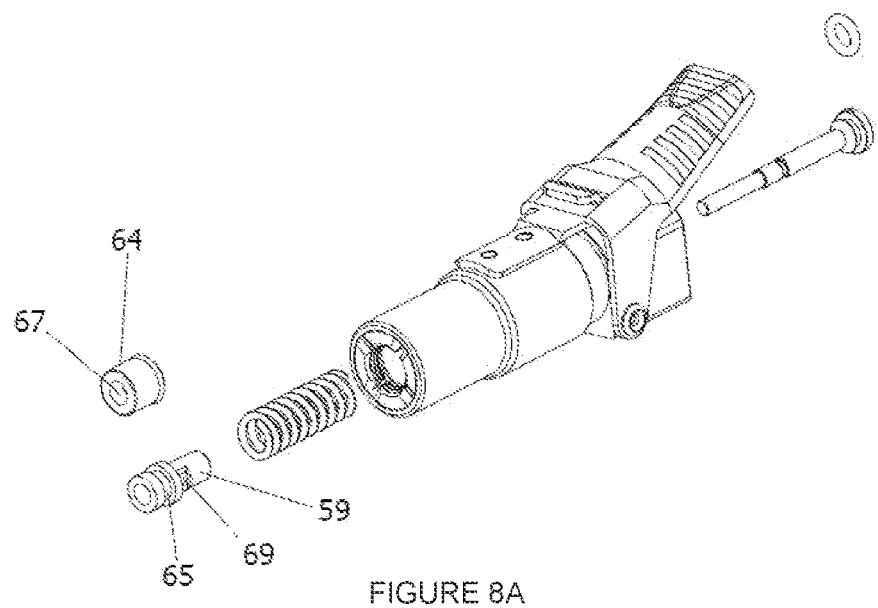
FIG. 8A is a perspective exploded view of the air shutoff valve assembly within the air chuck of the invention and the elastomeric seal removed from the assembly.
Figure 8B:
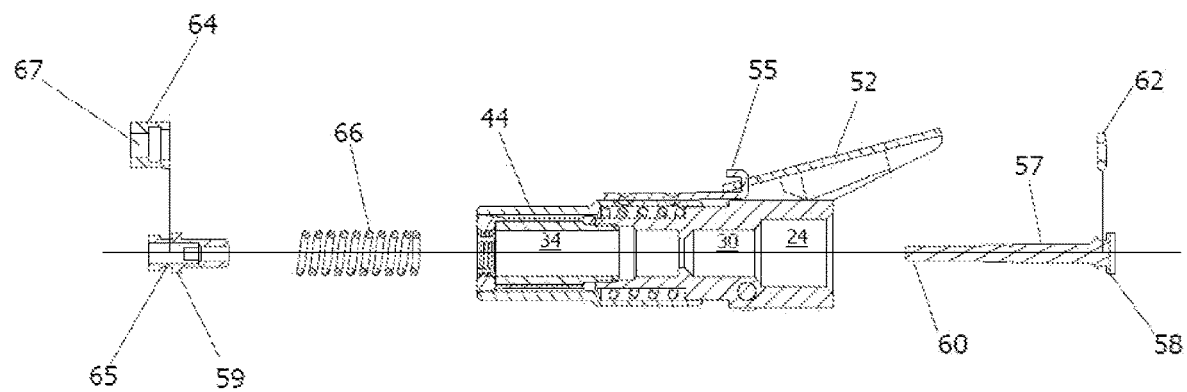
FIG. 8B is a cross-sectional view of FIG. 8A.
Figure 8C:
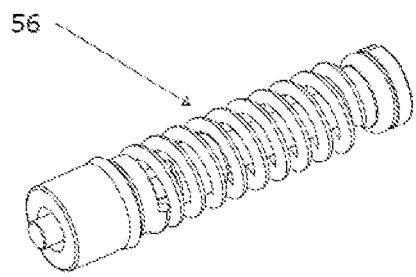
FIG. 8C is a perspective view of the air shutoff valve assembly.
Figure 8D:
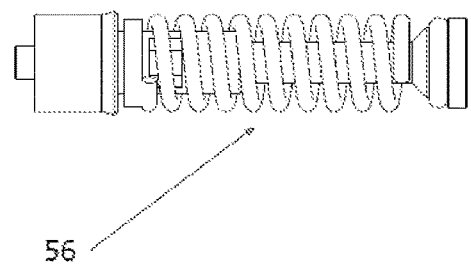
FIG. 8D is a side view of the air shutoff valve assembly.

FIG. 5A Illustrates the air chuck (10) in its default closed position.

At FIG. 5B the trigger (52) is depressed, the sliding sleeve (44) retracted and the deflectable internally threaded fingers (38) have been released to their sprung open position ready for engagement.

At figure 5C, the air chuck (10) has been pushed onto the tyre valve (12) and the shutoff valve mechanism (56) of the air chuck and the tyre valve seal (74) are opened to allow the free flow of air.

At FIG. 5D when the trigger (52) is released, the first compression spring (48) pushes the sliding sleeve (44) over the fingers (38) of the clamping member, compressing the fingers (38) and reducing the diameter of the threaded aperture (42) resulting in an active engagement between the threaded engagement faces (40) of the fingers (38) with the external threads (70) of the tyre valve (12) and allowing the operator to inflate or deflate the pneumatic tyre (14) (depicted in FIG. 1), without having to manually hold the air chuck (10) in position. The shutoff valve mechanism (56) of the air chuck and the tyre valve seal (74) both remain open. Referring to figure 5E, the trigger (52) is depressed, retracting the sliding sleeve (44) and releasing the internally threaded fingers (38) to sufficiently increase the size of the threaded aperture (42), releasing the threaded valve stem (70) of the tyre valve (12). As the air chuck is removed from the stem of the tyre valve (70), the second compression spring (66) biases the shutoff valve mechanism (56) into its closed position, reseating the O-ring seal (62) onto shoulder (32), and preventing loss of air from the source of compressed air. Simultaneously, the valve opening pin (60) of the shutoff valve mechanism (56) disengages from the valve pin (72) of the tyre valve (12), allowing the tyre valve seal (74) to automatically close, preventing loss of air from the pneumatic tyre (14).

Referring to FIG. 5F, the air chuck (10) is back in its default position.

Referring to FIG. 6, in a preferred embodiment of the invention the clamping member comprises a hollow tubular member (36) with four radially deflectable, sprung fingers (38) extending therefrom, each finger terminating in a threaded engagement face (40). The rear end of the tubular member (36) includes an internal shoulder (37) to allow for positive retention of the clamping member on the outside of the elongate housing (20). The threaded engagement faces (40) are complementary to the external thread (70) of the tyre valve (12). In an unrestrained state the sprung fingers (38) are in an open position to allow for engagement and disengagement with the tyre valve (12).

Testing has revealed that the air chuck of the invention allows for hassle free engagement onto the tyre valve while achieving an air tight seal every time. The positive engagement of the internally threaded fingers onto the tyre valve prevents the clamping member from slipping or jumping over the threads, thus significantly reducing the chances of the tyre valve becoming damaged from the engaging and disengaging of the air chuck. The elastomeric sliding seal with a biasing spring allows for a wide range of sealing positions and eliminates the need for the operator to further turn the air chuck onto the threaded tyre valve in order to achieve an effective airtight seal. The wide range of sealing positions also allows effective engagement with tyre valves of various thread lengths without having to manually retain the air chuck in a sealing position.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An air chuck configured to facilitate the connection of a pneumatic hose with a threaded stem of a tire valve, the air chuck comprising;
    an elongate housing defining an air passage through the full length thereof, a rear end of the elongate housing including an air inlet port configured to connect to the pneumatic hose, and a front section of the housing comprising an air outlet passage, a discharge end of which is configured to receive the threaded stem of the tire valve;
    an elastomeric seal, slidably located within the air outlet passage, towards the discharge end of the air outlet passage and biased by a spring in a forward position;
    and a clamping member, mounted externally about the outlet passage, wherein the clamping member comprises a hollow tubular member, at least a front end portion of which terminates in a plurality of separate, radially deflectable fingers, a free end portion of each finger extending towards the discharge end of the outlet passage, the combined free end portions of each finger together defining an aperture configured to receive the threaded stem of the tire valve, and wherein one or more engaging formations are located on an internal face of each finger towards the free end portion, wherein the size of the aperture is variable by the movement of a sleeve member, slidable over the body of the elongate housing and the clamping member, between a first position in which the fingers are compressed inwards to minimize the size of the aperture for engagement of the one or more engaging formations with the threaded stem of the tire valve, and a second position in which the fingers are released to deflect outwards, and the size of the aperture is increased to release the threaded stem of the tire valve from engagement with the one or more engaging formations, and wherein the sleeve member is biased in the first position by a first biasing spring, and connected by a linkage mechanism to a trigger which is pivotally mounted on the elongate housing and activable to draw the sleeve member from its first position, over the elongate housing against the bias of the first biasing spring, to its second position; the inherent bias of the first biasing spring biasing the sleeve member from the second position back to the first position, on release of the trigger.

2. The air chuck as claimed in claim 1, wherein the engaging formations located on the internal face of the free end portion of each finger comprise an internal thread, complementary to the thread of the threaded stem of the tire valve.

3. The air chuck as claimed in claim 1, wherein the free end portion of each finger extends beyond the discharge end of the outlet passage.

4. The air chuck as claimed in claim 1, wherein the first biasing spring is mounted externally about the elongate housing and internally of the sleeve member.

5. The air chuck as claimed in claim 1, wherein the first position of the sleeve member is a forward position on the elongate housing, and the second position of the sleeve member is a retracted position towards the rear end of the elongate housing.

6. The air chuck as claimed in claim 1, wherein the air inlet port extends into an air inlet passage, which terminates at a shoulder, to define an entrance to the air outlet passage.

7. The air chuck as claimed in claim 1, wherein the elastomeric seal is mounted on an air shut off valve mechanism, configured to prevent air flow through the elongate housing when the air chuck is disconnected from the tire valve.

8. The air chuck as claimed in claim 7, wherein the air shutoff valve mechanism comprises an elongate member, slidably located in the air passage, the elongate member having a first end, located within the air inlet passage and comprising an annular flange, greater in diameter than an entrance to the air outlet passage, and a second end, located towards the discharge end of the outlet passage, comprising a tire valve opening pin.

9. The air chuck as claimed in claim 8, wherein the elastomeric seal is mounted about the tire valve opening pin of the air shutoff valve mechanism, and a sealing element is mounted on the annular flange.

10. The air chuck as claimed in claim 8, wherein the spring for biasing the air shutoff valve mechanism in a shutoff position is mounted externally of the elongate member, between the entrance to the air outlet passage and the elastomeric seal.

11. The air chuck as claimed in claim 8, wherein a central bore extends through the elastomeric seal.

12. The air chuck as claimed in claim 11, wherein the central bore of the elastomeric seal is greater than the diameter of the tire valve opening pin, to provide an air channel between the elastomeric seal and the tire valve opening pin.

13. The air chuck as claimed in claim 12, wherein one or more air communication ports extend from behind the elastomeric seal to the air channel between the elastomeric seal and the tire valve opening pin.

14. The air chuck as claimed in claim 8, wherein the elastomeric seal is mounted on a seal retainer, comprising a tubular body, receivable on the elongate member of the air shutoff valve mechanism.

15. The air chuck as claimed in claim 14, wherein the seal retainer includes an external mounting groove configured to receive and retain a base of the elastomeric seal.

16. The air chuck as claimed in claim 15, wherein the elastomeric seal and seal retainer are dimensioned such that an outer wall of the elastomeric seal contacts an inner wall of the air outlet passage of the elongate housing in a sliding sealing fit.

* * * * *